(12) United States Patent
Brooke

(10) Patent No.: US 6,691,524 B2
(45) Date of Patent: Feb. 17, 2004

(54) METHODS AND APPARATUS FOR CONTROLLING COMPRESSOR SPEED

(75) Inventor: Richard Dana Brooke, Louisville, KY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/113,896

(22) Filed: Mar. 29, 2002

(65) Prior Publication Data

US 2003/0182952 A1 Oct. 2, 2003

(51) Int. Cl.⁷ .............................. F25D 17/00; F25B 1/00
(52) U.S. Cl. ........................................ 62/180; 62/228.4
(58) Field of Search ............................ 62/228.4, 180, 62/178, 181, 228.1, 228.5, 229

(56) References Cited

U.S. PATENT DOCUMENTS

| | | | |
|---|---|---|---|
| 4,481,787 A | 11/1984 | Lynch | |
| 4,662,185 A | 5/1987 | Kobayashi et al. | |
| 4,949,548 A | 8/1990 | Meyer | |
| 4,959,969 A | 10/1990 | Okamoto et al. | |
| 5,078,318 A | * 1/1992 | Kawai et al. | 237/2 B |
| 5,255,530 A | 10/1993 | Janke | |
| 5,996,361 A | * 12/1999 | Bessler et al. | 62/163 |

* cited by examiner

Primary Examiner—Marc Norman
(74) Attorney, Agent, or Firm—H. Neil Houser, Esq.; Armstrong Teasdale LLP

(57) ABSTRACT

A method for controlling a sealed system including a variable speed compressor coupled to a controller includes defining a first set of temperature ranges for operating the compressor during a temperature increase period, defining a second set of temperature ranges for operating the compressor during a temperature decrease period, the second set of ranges different than the first set of ranges, and operating the compressor using the defined first set and the defined second set.

9 Claims, 8 Drawing Sheets

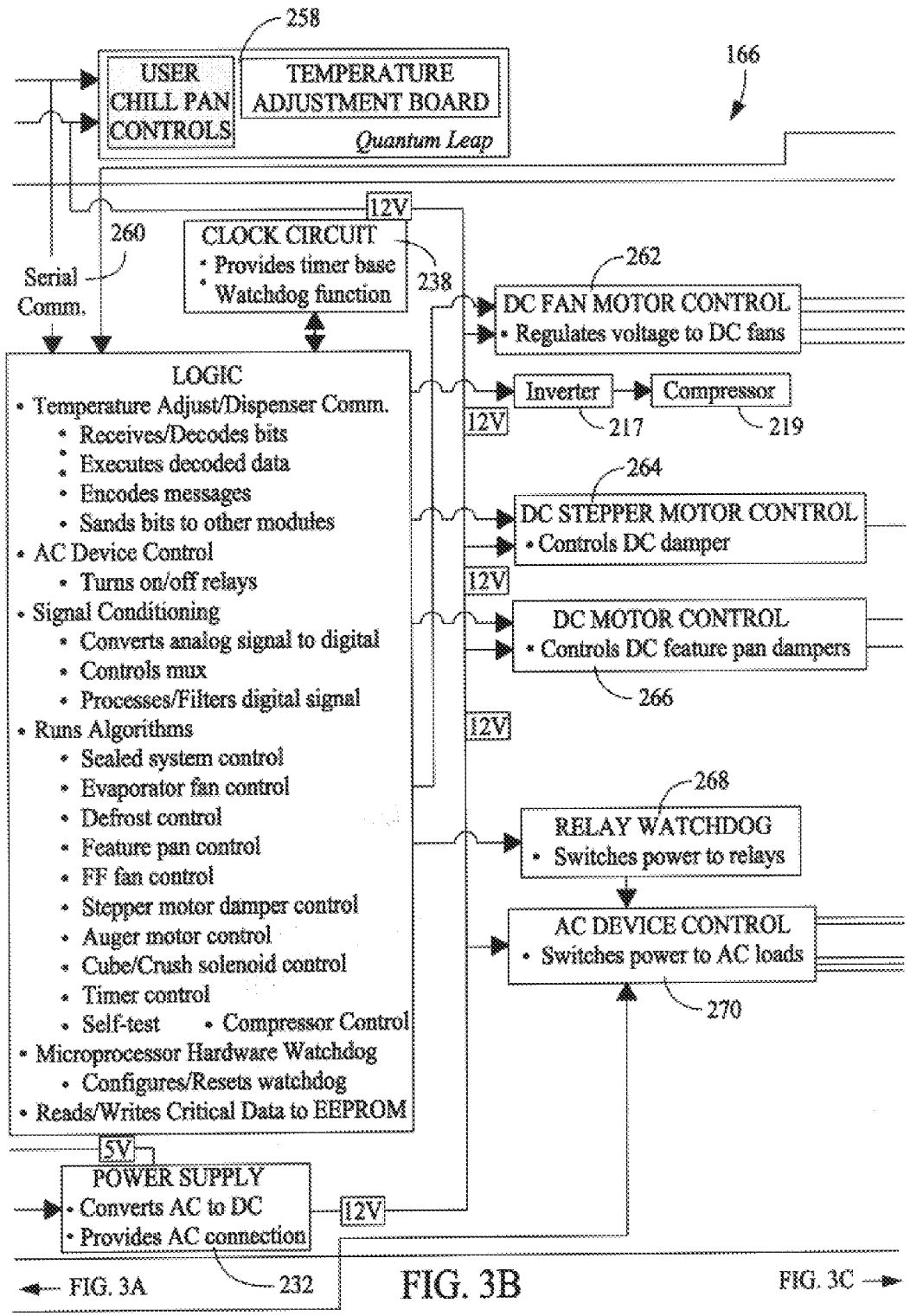

METHODS AND APPARATUS FOR CONTROLLING COMPRESSOR SPEED

BACKGROUND OF THE INVENTION

This invention relates generally to refrigerant systems, and more particularly to a method for controlling a compressor speed in the refrigerant system.

Modern refrigerators typically include a compressor, an evaporator, and a condenser in a closed refrigeration circuit, and a number of fans that facilitate the refrigeration circuit and direct cooled air into refrigeration compartments. Conventionally, the compressor, evaporator and condenser are operated at a single speed, and a plurality of single speed fans are employed in association with the condenser, evaporator, condenser and also to direct cooled air throughout the refrigerator. Collectively, these components are sometimes referred to as a sealed system. While these single speed sealed systems have been satisfactory in the past, they are now perceived as disadvantageous in several aspects.

For example, such single speed systems often entail considerable temperature variation in operation of the refrigerator as the sealed system cycles on an off. Further, the refrigerator can sometimes be undesirably noisy as it cycles from an off or relatively silent condition to an on condition with the sealed system components energized. In addition, single speed systems are not as energy efficient as desired.

While most of these disadvantages can be addressed by using multiple speed or variable speed fans and sealed system components, use of variable speed components complicates the refrigeration controls considerably. A number of operating states corresponding to different combinations of the components at various speeds is virtually infinite, and finding and maintaining an optimal refrigerator state in an energy efficient manner can be formidable task. Additionally, manipulating component speeds in an energy efficient manner while responding to changing operating conditions and environments, such as door open events and ambient temperature fluctuation, is a challenge.

BRIEF DESCRIPTION OF THE INVENTION

In one aspect, a method for controlling a sealed system including a variable speed compressor coupled to a controller is provided. The method includes defining a first set of temperature ranges for operating the compressor during a temperature increase period, defining a second set of temperature ranges for operating the compressor during a temperature decrease period, the second set of ranges different than the first set of ranges, and operating the compressor using the defined first set and the defined second set.

In another aspect, a method for controlling a sealed system including a variable speed compressor coupled to a controller is provided. The method includes defining a first set of temperature ranges for operating the compressor during a temperature increase period including a low temperature range for operating the compressor in a low speed, a medium temperature range for operating the compressor in a medium speed, and a high temperature range for operating the compressor in a high speed, and defining a second set of temperature ranges for operating the compressor during a temperature decrease period, the second set of ranges different than the first set of ranges. The method also includes operating the compressor in a high speed until a low temperature range threshold is reached, operating the compressor in a medium speed until a set-point upper hysteresis is reached, and operating the compressor in a low speed until a set-point lower hysteresis is reached.

In another aspect, a refrigeration device is provided. The refrigeration device includes a compressor operable in a multiplicity of speeds, a condenser fan operable in a multiplicity of speeds, an evaporator fan operable in a multiplicity of speeds, a controller operatively coupled to at least one of the compressor, the condenser fan, and the evaporator fan. The controller includes a first set of temperature ranges for operating at least one of the compressor, the condenser fan, and the evaporator fan during a temperature increase period and a second set of temperature ranges for operating at least one of the compressor, the condenser fan, and the evaporator fan during a temperature decrease period, the second set of ranges different than the first set of ranges, and a thermistor coupled to the controller, the controller configured to operate at least one of the compressor, the condenser fan, and the evaporator fan using the first set of ranges and the second set of ranges.

In another aspect, a refrigeration device including a compressor operable in a multiplicity of speeds and a controller operatively coupled the compressor is provided. The controller includes a first set of temperature ranges for operating the compressor during a temperature increase period and a second set of temperature ranges for operating the compressor during a temperature decrease period, the second set of ranges different than the first set of ranges, and a thermistor coupled to the controller. The controller is configured to define a first set of temperature ranges for operating the compressor during a temperature increase period, the first set of temperature ranges including a low temperature range for operating the compressor in a low speed, a medium temperature range for operating the compressor in a medium speed, and a high temperature range for operating the compressor in a high speed, define a second set of temperature ranges for operating the compressor during a temperature decrease period, the second set of ranges different than the first set of ranges, and operate the compressor in a high speed until a low temperature range threshold is reached, operate the compressor in a medium speed until a set-point upper hysteresis is reached, and operate the compressor in a low speed until a set-point lower hysteresis is reached.

In another aspect, a control system for a refrigeration system is provided. The refrigeration system includes a fresh food compartment and a freezer compartment with a damper establishing flow communication therebetween, a sealed system for forcing cold air through the refrigerator compartments, the sealed system including a compressor, a condenser, an evaporator fan and a fresh food compartment fan. The control system includes a controller operatively coupled to the damper, the compressor, the condenser fan, the evaporator fan and the fresh food fan, the controller including a first set of temperature ranges for operating the compressor during a temperature increase period and a second set of temperature ranges for operating the compressor during a temperature decrease period, the second set of ranges different than the first set of ranges, and a thermistor coupled to the controller, the controller configured to operate the compressor using the first set of ranges and the second set of ranges.

In another aspect, a control system for a refrigeration system is provided. The refrigeration system includes a fresh food compartment and a freezer compartment with a damper establishing flow communication therebetween, a sealed system for forcing cold air through the refrigerator compartments, the sealed system including a compressor, a condenser, an evaporator fan and a fresh food compartment fan. The control system includes a controller operatively coupled to the damper, the compressor, the condenser fan, the evaporator fan and the fresh food fan, the controller including a first set of temperature ranges for operating the compressor during a temperature increase period and a second set of temperature ranges for operating the compressor during a temperature decrease period, the second set of ranges different than the first set of ranges, and a thermistor coupled to the controller. The controller is configured to define a first set of temperature ranges for operating the compressor during a temperature increase period, the first set of temperature ranges including a low temperature range for operating the compressor in a low speed, a medium temperature range for operating the compressor in a medium speed, and a high temperature range for operating the compressor in a high speed, define a second set of temperature ranges for operating the compressor during a temperature decrease period, the second set of ranges different than the first set of ranges. The controller is also configured to operate the compressor in a high speed until a low temperature range threshold is reached, operate the compressor in a medium speed until a set-point upper hysteresis is reached, and operate the compressor in a low speed until a set-point lower hysteresis is reached.

DETAILED DESCRIPTION OF THE INVENTION

Figure 1:
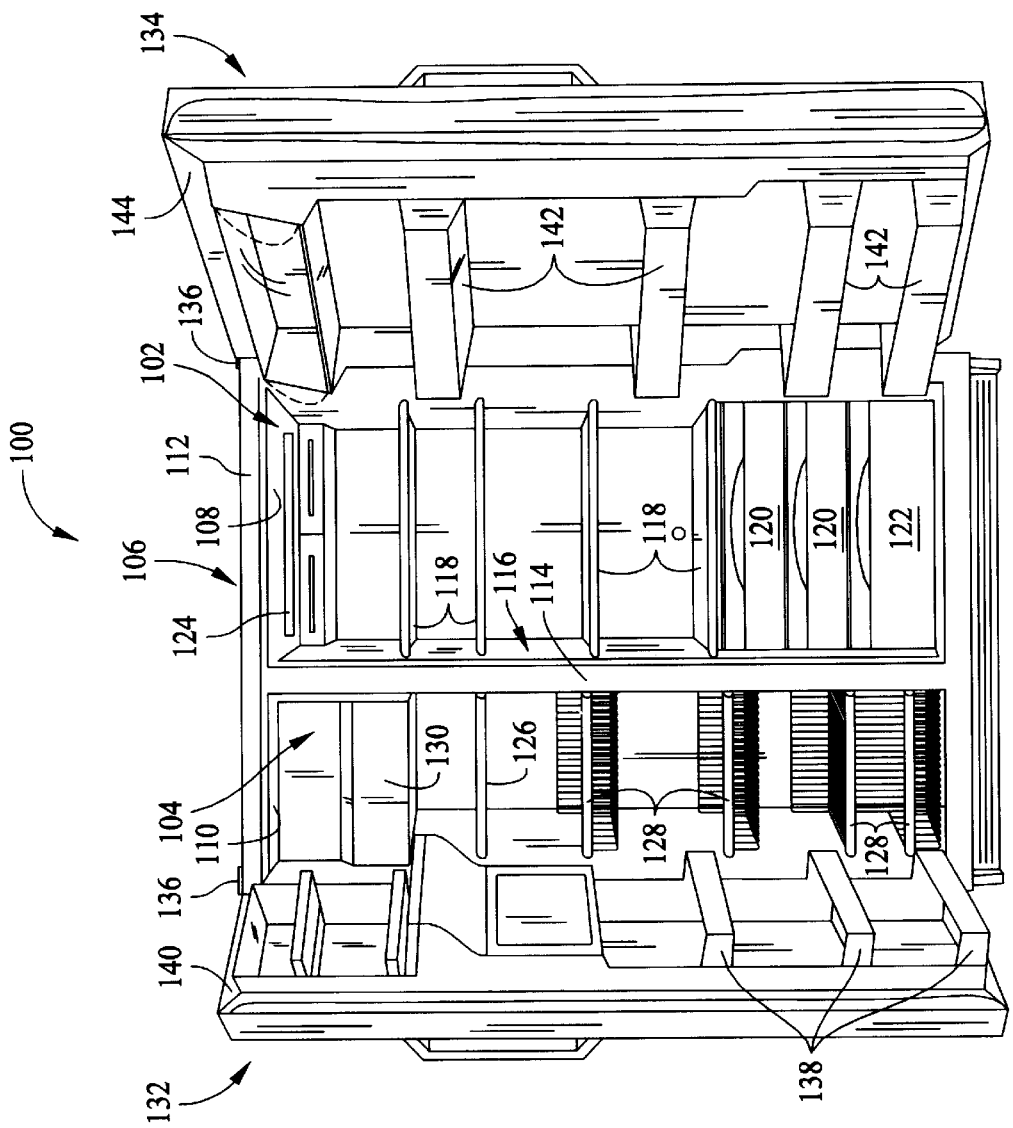
FIG. 1 is a perspective view of an exemplary refrigerator.

FIG. 1 illustrates a side-by-side refrigerator 100 in which the present invention may be practiced. It is recognized, however, that the benefits of the present invention apply to other types of appliances including single or multiple compartment refrigerators, single or multiple compartment freezers, combination refrigerator and freezers (including top mount systems), and other refrigeration devices, including but not limited to climate control systems, water coolers, wine coolers, ice makers, and vending machines having similar control issues and considerations. Consequently, the description set forth herein is for illustrative purposes only and is not intended to limit the invention in any aspect.

Refrigerator 100 includes a fresh food storage compartment 102 and a freezer storage compartment 104. Freezer compartment 104 and fresh food compartment 102 are arranged side-by-side in an outer case 106 with inner liners 108 and 110. A space between case 106 and liners 108 and 110, and between liners 108 and 110, is filled with foamed-in-place insulation or other known insulation material applied according to known techniques. Outer case 106 normally is formed by folding a sheet of a suitable material, such as pre-painted steel, into an inverted U-shape to form top and side walls of case. A bottom wall of case 106 normally is formed separately and attached to the case side walls and to a bottom frame that provides support for refrigerator 100.

Inner liners 108 and 110 are molded from a suitable plastic material to form freezer compartment 104 and fresh food compartment 102, respectively. Alternatively, liners 108, 110 may be formed by bending and welding a sheet of a suitable metal, such as steel. The illustrative embodiment includes two separate liners 108, 110 as it is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of liners. Breaker strip 112 is formed from a suitable resilient material, such as an extruded acrylo-butadiene-styrene based material (commonly referred to as ABS).

The insulation in the space between liners 108, 110 is covered by another strip of suitable resilient material, which also commonly is referred to as a mullion 114. Mullion 114 also preferably is formed of an extruded ABS material. It will be understood that in a refrigerator with separate mullion dividing a unitary liner into a freezer and a fresh food compartment, a front face member of mullion corresponds to mullion 114. Breaker strip 112 and mullion 114 form a front face, and extend completely around inner peripheral edges of case 106 and vertically between liners 108, 110. Mullion 114, insulation between compartments 102, 104, and a spaced wall of liners 108, 110 separating compartments 102, 104 sometimes are collectively referred to herein as a center mullion wall 116.

Shelves 118 and slide-out drawers 120 normally are provided in fresh food compartment 102 to support items being stored therein. A bottom drawer or pan 122 partly forms a quick chill and thaw system (not shown) and selectively controlled, together with other refrigerator features, by a microprocessor (not shown in FIG. 1) according to user preference via manipulation of a control interface 124 mounted in an upper region of fresh food storage compartment 102 and coupled to the microprocessor. A shelf 126 and wire baskets 128 are also provided in freezer compartment 104. In addition, an ice maker 130 may be provided in freezer compartment 104.

A freezer door 132 and a fresh food door 134 close access openings to fresh food and freezer compartments 102, 104, respectively. Each door 132, 134 is mounted by a top hinge 136 and a bottom hinge (not shown) to rotate about its outer vertical edge between an open position, as shown in FIG. 1, and a closed position (not shown) closing the associated storage compartment. Freezer door 132 includes a plurality of storage shelves 138 and a sealing gasket 140, and fresh food door 134 also includes a plurality of storage shelves 142 and a sealing gasket 144.

In accordance with known refrigerators, refrigerator 100 also includes a machinery compartment (not shown) that at least partially contains components for executing a known vapor compression cycle for cooling air inside fresh food compartment 102 and freezer compartment 104 by transferring heat from the inside of refrigerator 100 and rejecting the heat to the outside of refrigerator 100. The components include a compressor (not shown in FIG. 1), a condenser (not shown in FIG. 1), an expansion device (not shown in FIG. 1), and an evaporator (not shown in FIG. 1) connected in series and charged with a refrigerant. The evaporator is a type of heat exchanger which transfers heat from air passing over the evaporator to a refrigerant flowing through the evaporator, thereby causing the refrigerant to vaporize and cool the evaporator surface, while heat is rejected in the condenser. The cooled air is used to refrigerate one or more refrigerator or freezer compartments via fans (not shown in FIG. 1). Collectively, the vapor compression cycle components in a refrigeration circuit, associated fans (e.g. an evaporator fan and a condenser fan), and associated compartments are referred to herein as a sealed system. The construction of the sealed system is well known and therefore not described in detail herein, and the sealed system components are operable at varying speeds to force cold air through the refrigerator subject to the following control scheme.

Figure 2:
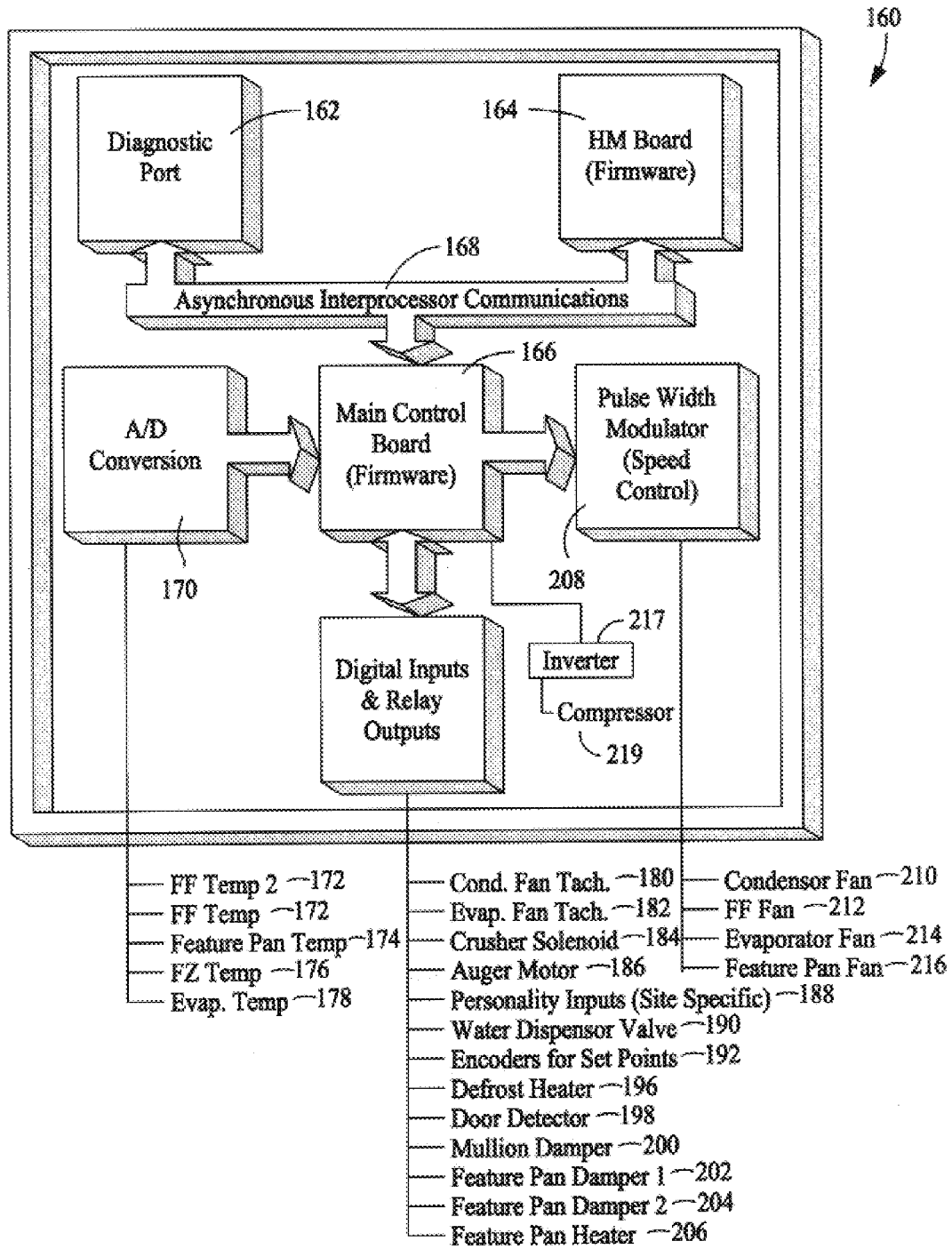
FIG. 2 is a block diagram of a refrigerator controller in accordance with one embodiment of the present invention.
Figure 3A:
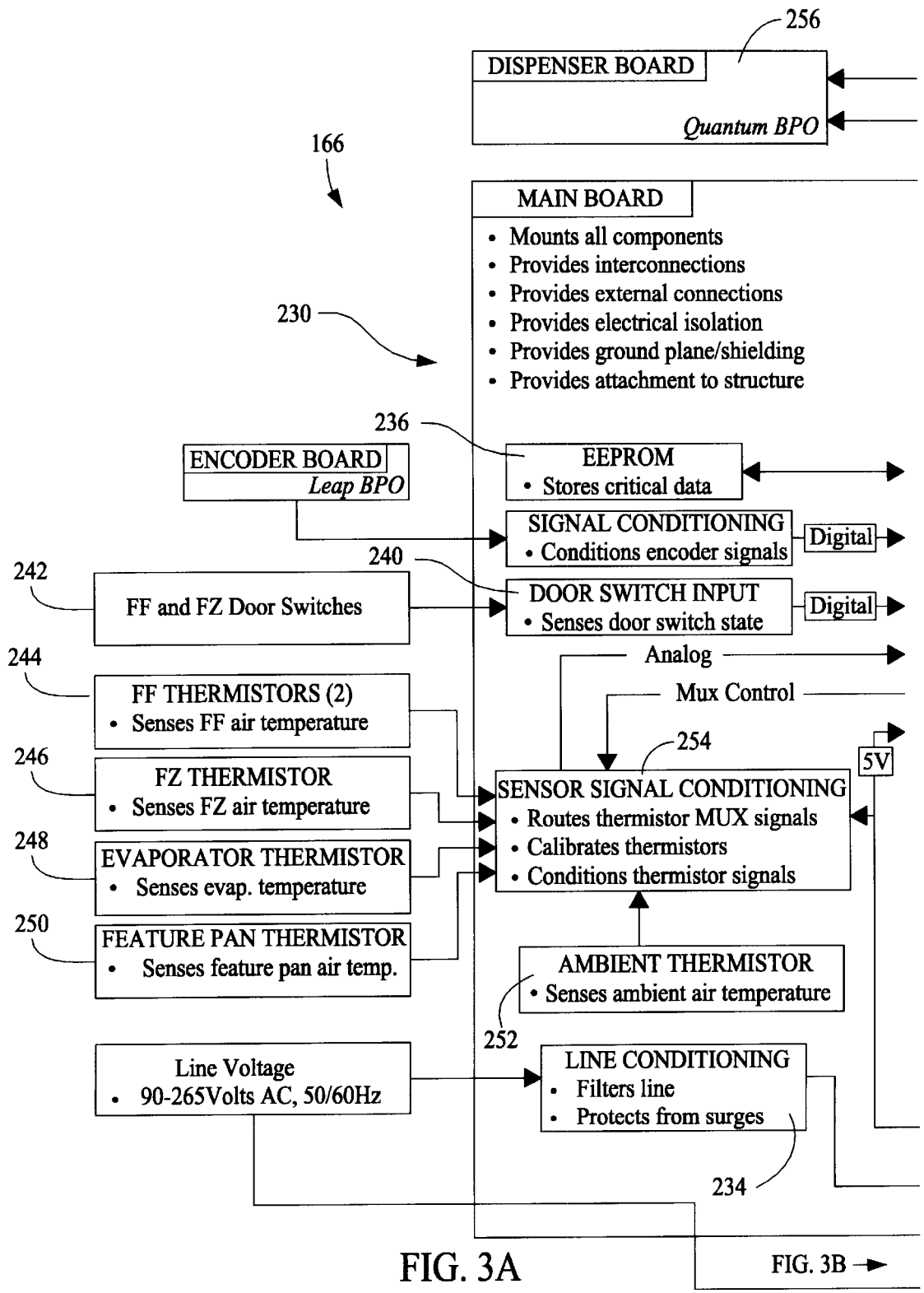
FIGS. 3A, 3B and 3C illustrate a block diagram of the main control board shown in FIG. 2.
Figures 3B, 3C:
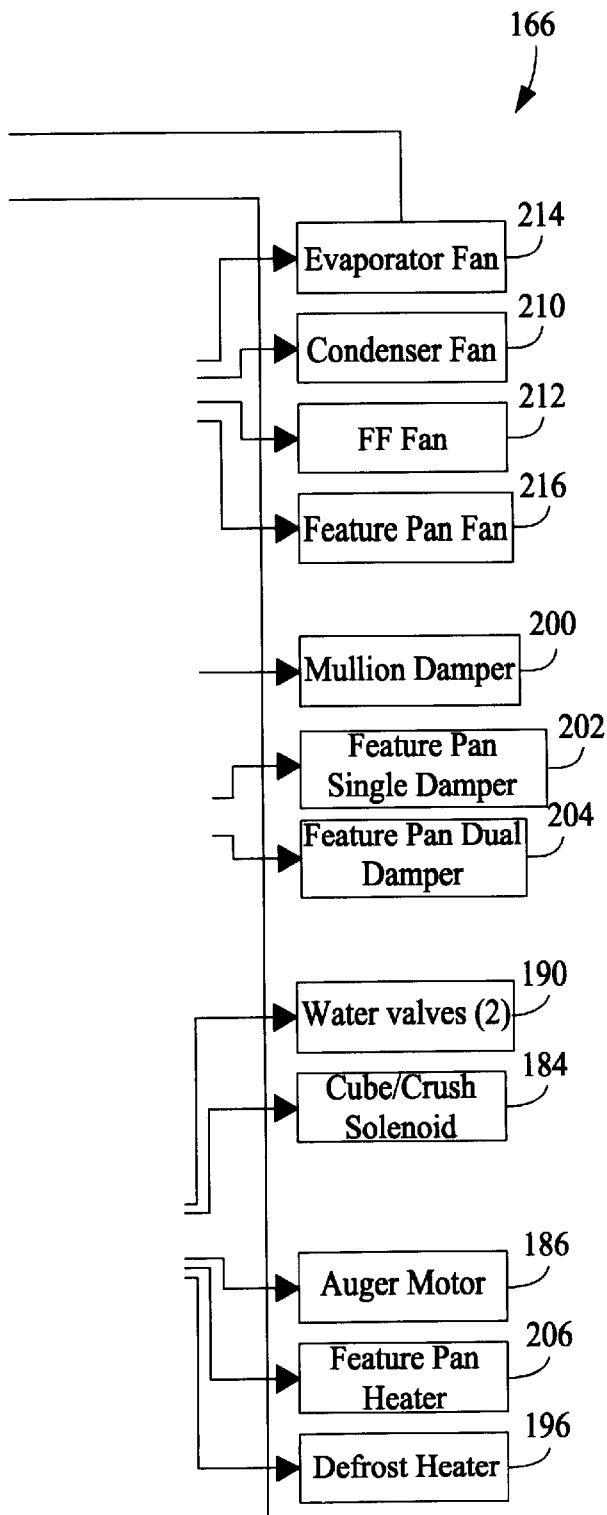
Figure 4:
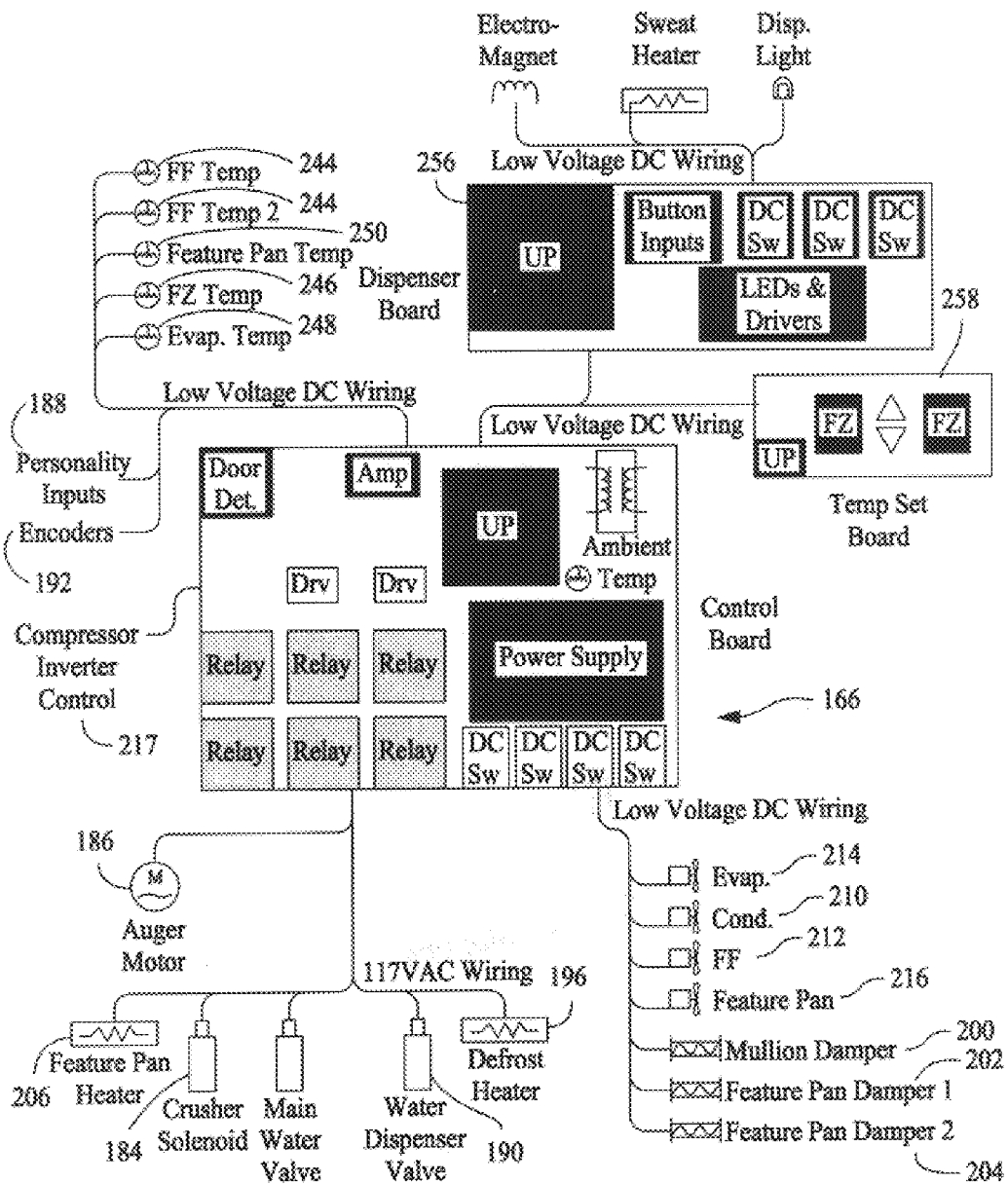
FIG. 4 is a block diagram of the main control board shown in FIG. 2.

FIG. 2 illustrates an exemplary controller 160 in accordance with one embodiment of the present invention. Controller 160 can be used, for example, in refrigerators, freezers and combinations thereof, such as, for example side-by-side refrigerator 100 (shown in FIG. 1).

Controller 160 includes a diagnostic port 162 and a human machine interface (HMI) board 164 coupled to a main control board 166 by an asynchronous interprocessor communications bus 168. An analog to digital converter ("A/D converter") 170 is coupled to main control board 166. A/D converter 170 converts analog signals from a plurality of sensors including one or more fresh food compartment temperature sensors 172, a quick chill/thaw feature pan (i.e., pan 122 shown in FIG. 1 or other temperature controlled compartment) temperature sensors 174, freezer temperature sensors 176, external temperature sensors (not shown in FIG. 2), and evaporator temperature sensors 178 into digital signals for processing by main control board 166.

In an alternative embodiment (not shown), A/D converter 170 digitizes other input functions (not shown), such as a power supply current and voltage, brownout detection, compressor cycle adjustment, analog time and delay inputs (both use based and sensor based) where the analog input is coupled to an auxiliary device (e.g., clock or finger pressure activated switch), sensing of the compressor sealed system components for diagnostics and power/energy optimization. Further input functions include external communication via IR detectors or sound detectors, HMI display dimming based on ambient light, adjustment of the refrigerator to react to food loading and changing the air flow/pressure accordingly to ensure food load cooling or heating as desired, and altitude adjustment to ensure even food load cooling and enhance pull-down rate at various altitudes by changing fan speed and varying air flow.

Digital input and relay outputs correspond to, but are not limited to, a condenser fan speed 180, an evaporator fan speed 182, a crusher solenoid 184, an auger motor 186, personality inputs 188, a water dispenser valve 190, encoders 192 for set points, a defrost heater 196, a door detector 198, a mullion damper 200, feature pan air handler dampers 202, 204, and a quick chill/thaw feature pan heater 206. Main control board 166 also is coupled to a pulse width modulator 208 for controlling the operating speed of a condenser fan 210, a fresh food compartment fan 212, an evaporator fan 214, and a quick chill system feature pan fan 216. Additionally, main control board 166 is coupled to an inverter 217 that is, in turn, coupled to a compressor 219. Inverter 217 is supplied continuously with AC power and used to control compressor 219 at a selected speed in response to a signal from main control board 166, such as square wave of 0–5 V in one embodiment. As such, compressor 219 is operable at a plurality of speeds, as further explained below.

In the exemplary embodiment, compressor 219 and condenser fan 210 are operated at a complementary speed (i.e., high, medium or low) through the compressor/condenser parameter. In other words, except where indicated when the compressor speed is "high" the condenser fan speed is "high," when the compressor speed is "medium" the condenser fan speed is "medium" and when the compressor speed is "low" the condenser fan speed is "low." The speeds of the compressor and condenser fan are complementary in a relative sense. It is contemplated that actual revolutions per minute of the compressor and condenser fan in a given speed (high, medium, and low) may differ from one another, and it is contemplated that the compressor fan and the condenser fan in further embodiments may be independently controlled (i.e., not at complementary speeds)

FIGS. 3A, 3B, 3C, and 4 are more detailed block diagrams of main control board 166. As shown in FIGS. 3A, 3B, 3C, and 4, main control board 166 includes a processor 230. Processor 230 performs tempera e adjustments/dispenser communication, AC device control, signal conditioning, microprocessor hardware watchdog, and EEPROM read/write functions. In addition, processor 230 executes many control algorithms including sealed system control, evaporator fan control, defrost control, feature pan control, fresh food fan control, stepper motor damper control, water valve control, auger motor control, cube/crush solenoid control timer control, and self-test operations.

Processor 230 is coupled to a power supply 232 which receives an AC power signal from a line conditioning unit 234. Line conditioning unit 234 filters a line voltage which is, for example, a 90–265 Volts AC, 50/60 Hz signal. Processor 230 also is coupled to an EEPROM 236 and a clock circuit 238.

A door switch input sensor 240 is coupled to fresh food and freezer door switches 242, and senses a door switch state. A signal is supplied from door switch input sensor 240 to processor 230, in digital form, indicative of the door switch state. Fresh food thermistors 244, a freezer thermistor 246, at least one evaporator thermistor 248, a feature pan thermistor 250, and an ambient thermistor 252 are coupled to processor 230 via a sensor signal conditioner 254. Conditioner 254 receives a multiplex control signal from processor 230 and provides analog signals to processor 230 representative of the respective sensed temperatures. Processor 230 also is coupled to a dispenser board 256 and a temperature adjustment board 258 via a serial communications link 260. Conditioner 254 also calibrates the above-described thermistors 244, 246, 248, 250, and 252.

Processor 230 provides control outputs to a DC fan motor control 262, a DC stepper motor control 264, a DC motor control 266, and a relay watchdog 268. Watchdog 268 is coupled to an AC device controller 270 that provides power to AC loads, such as to water valve 190, cube/crush solenoid 184, auger motor 186, a feature pan heater 206, and defrost heater 196. DC fan motor control 266 is coupled to evaporator fan 214, condenser fan 210, fresh food fan 212, and feature pan fan 216. DC stepper motor control 266 is coupled to mullion damper 200, and DC motor control 266 is coupled to one of more sealed system dampers.

Periodically, controller 160 reads fresh food compartment thermistors 244 and freezer thermistor 246 to determine respective temperatures of fresh food compartment 102 (shown in FIG. 1) and freezer compartment 104 (shown in FIG. 1). Based on the determined temperatures of compartments 102, 104, controller 160 makes control algorithm decisions, including selection of operating speed of the various sealed system components, as described below.

Figure 5:
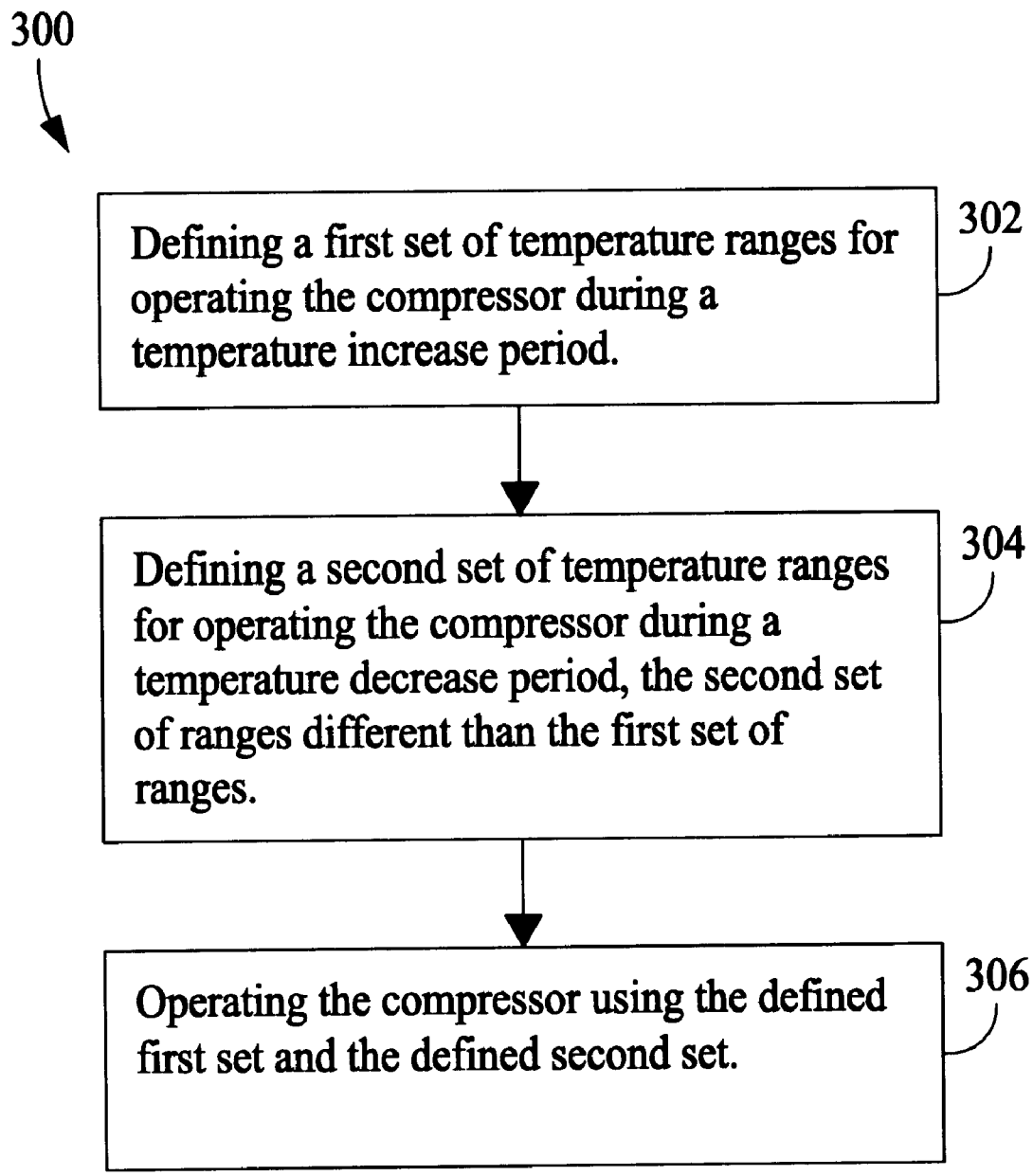
FIG. 5 is a flowchart illustrating a method of controlling a compressor speed.
Figure 6:
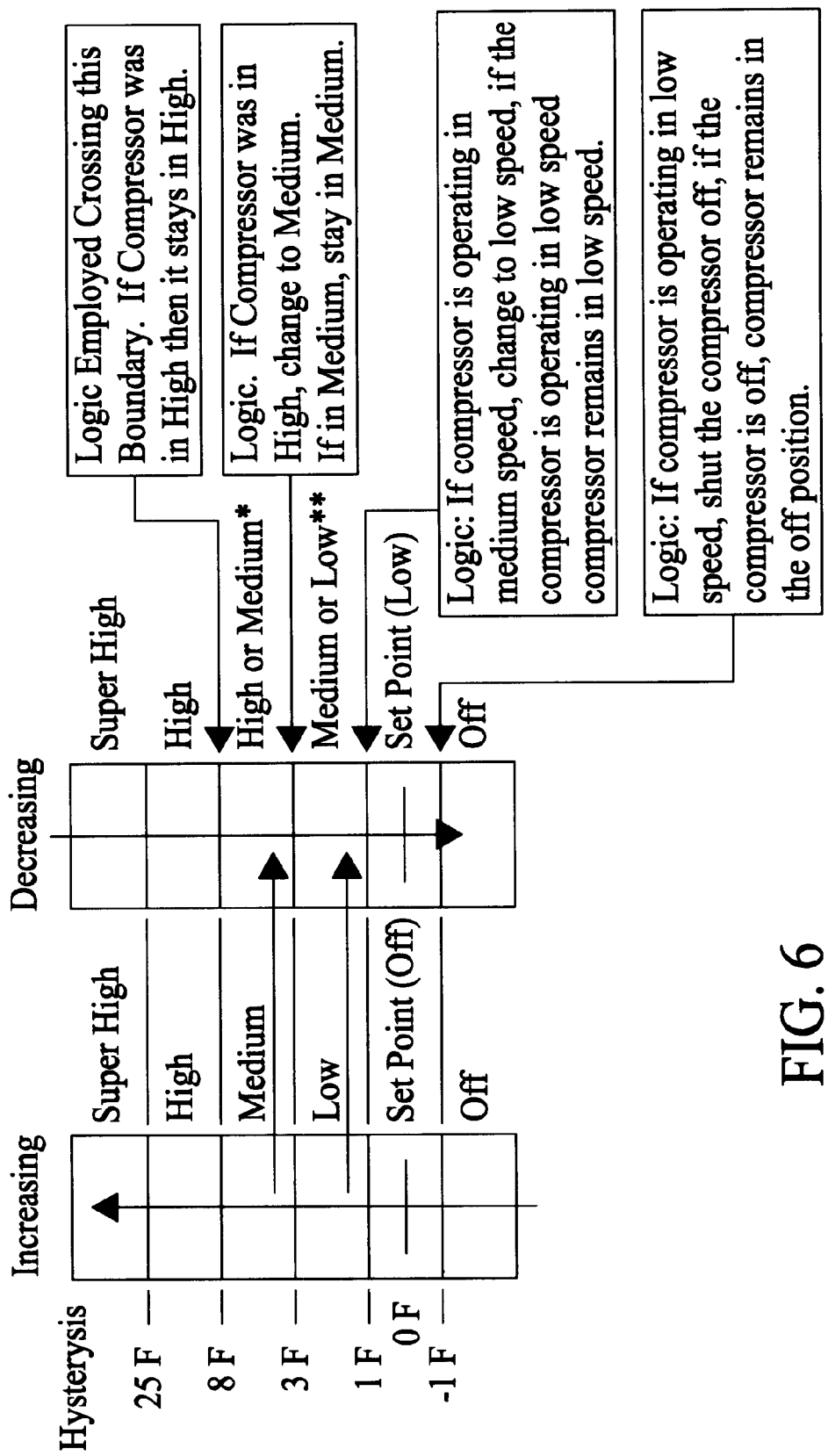
FIG. 6 is an illustration of the method described in FIG. 5.

FIG. 5 illustrates an exemplary method 300 for controlling a sealed system 100 including variable speed compressor 219 coupled to controller 160. FIG. 6 is an illustration of the method described in FIG. 5. Method 300 includes defining 302 a first set of temperature ranges for operating compressor 219 during a temperature increase period, defining 304 a second set of temperature ranges for operating compressor 219 during a temperature decrease period, the second set of ranges different than the first set of ranges, and operating 306 compressor 219 using the defined first set and the defined second set. In use, method 300 facilitates overcoming the thermal load by maintaining excessive cooling (high speed operation) until the target temperature can be achieved.

While the illustrated sealed system 100 is installed in a refrigerator/freezer appliance, the refrigerator/freezer is but one type of appliance in which the benefits of the present invention are realized. It is contemplated that the present invention may be practiced in other appliances beyond that specifically illustrated and described herein, and in particular it is recognized that the present invention is well suited for applications in other types of appliances, such as a top freezer, a bottom freezer, a refrigerator unit, a freezer unit, a wine cooler, a vending machine, and a free standing icemaker, as well as to a wide variety of other application where cooling is required. Therefore, the sealed system and its associated temperature ranges describes herein are offered by way of illustration rather than limitation, and it is appreciated that the specific temperature ranges may vary in a wide variety of appliances and applications due to a specific cooling requirement without departing from the scope and spirit of the instant invention. Additionally, it is appreciated that the temperature ranges and equipment speeds corresponding to the temperature range may vary. For example, the increasing and decreasing temperature ranges described herein can be divided into a plurality of different ranges within the overall increasing or decreasing temperature range. For ease of illustration and not as a limitation only four temperature ranges and four component speeds operating in the corresponding temperature ranges have been described, although, additional ranges and speeds can be utilized in a wide variety of appliances and applications due to a specific cooling requirement without departing from the scope and spirit of the instant invention.

In an exemplary embodiment, defining 302 a first set of temperature ranges for operating at least one of compressor 219, evaporator fan 214, and condenser fan 210, during a temperature increase period includes defining a target set-point and defining a set of temperature ranges that are offset from the target set-point, wherein in the target set-point is a temperature at which the compressor stops. For example, as an illustration, and not a limitation, the target set-point range for a freezer section can be set to between approximately −1° Fahrenheit (F) and +1° F. In another embodiment the target set-point for a freezer section can be set to approximately 0° F., the target temperature for a refrigerator fresh food compartment can be set at approximately 37° F. The first set of temperature ranges include, but are not limited to, a low temperature range for operating compressor 219 at a low speed, a medium temperature range for operating compressor 219 at a medium speed, a high temperature range for operating compressor 219 at a high speed, and a super high temperature range. In one embodiment, operating in a super high temperature range includes operating compressor 219 and evaporator fan 214 in a medium speed and operating condenser fan 210 in a super high speed. Upon entering the high temperature range, after operating in the super high temperature range, compressor 219, evaporator fan 214, and condenser fan 210 resume operating in a high speed mode.

In the exemplary embodiment, the low temperature offset range is between approximately 1° F. and approximately 3° F., the medium temperature offset range is between approximately 3° F. and approximately 8° F., the high temperature offset range is between approximately 8° F. and approximately 25° F., and the super high temperature offset range is above approximately 25° F. offset from the target temperature.

In an exemplary embodiment, defining 304 a second set of temperature ranges for operating at least one of compressor 219, evaporator fan 214, and condenser fan 210 during a temperature decrease period includes defining a set of temperature ranges that are offset from the target set-point, such as, but not limited to a low temperature range for operating compressor 219 at a low speed, a medium temperature range for operating compressor 219 at a medium speed, a high temperature range for operating compressor 219 at a high speed, and a super high temperature range for operating compressor 219, evaporator fan 214, and condenser fan 210 as describe previously herein. In the exemplary embodiment, the low temperature offset range is between approximately 1° and approximately 3° F., the medium temperature offset range is between approximately 1° F. and approximately 8° F., and the high temperature offset range is between approximately 3° F. and approximately 25° F., and the super high temperature offset range is greater than 25° F.

In use, fresh food thermistors 244 sense a freezer food (FZ) compartment temperature respectively. If thermistors 244 sense that the FZ compartment temperature is above any of the temperature ranges describes previously herein, controller, 160 accordingly turns on the sealed system (i.e., activates compressor 219 and all the fans) thereby increasing a speed of compressor 219 at predetermined levels. For example, compressor 219 will turn on to the low speed at temperatures in the low speed temperature range, i.e. above the +1° hysteresis, as defined herein. As temperatures rise above 3° from the target set-point, the speed of compressor 219 will increase to the medium operating speed. If the offset temperature exceeds 8° F., the speed of compressor 219 will increase to the high operating speed. In another embodiment, if the offset temperature exceeds 25F., the speed of compressor 219 will increase to the super high operating speed which includes a set of compressor and fan speeds to allow FF or FZ pulldown without exceeding a maximum power consumption of a compressor motor inverter.

When FZ thermistor 246 senses a freezer food compartment temperature is decreasing, the speed of compressor 219 will decrease as shown in FIG. 6. In one embodiment, if compressor 219 is operating in high speed because the offset temperature range exceeds 8° F, compressor 219 will operate in the high speed until the sensed temperature decreases to approximately 3° F. Compressor 219 maintains high speed operation until the low speed temperature range (offset 1° F. to 3° F.) is reached and then compressor 219 is switched to the medium speed. Subsequently, medium speed is maintained until the target temperature range is achieved (−1° F. to +1° F.), and then the low speed is set. The low speed continues until the lower limit of the target temperature range is reached, i.e. −1° F. from the set-point, shutting off compressor 219. In another embodiment, if compressor 219 is operating in the medium speed because the offset temperature range exceeds 3° from the set-point but is less than 8°, i.e. during the compressor increasing cycle, the maximum speed of compressor was the medium speed, compressor 219 will operate in the medium speed until the sensed temperature decreases to approximately 1° F. Compressor 219 maintains medium speed operation until the +1° F. above set-point is achieved and then compressor 219 is switched to the low speed. The low speed continues until the −1° F. below the set-point is reached, shutting off compressor 219. Operating in a medium speed until a target temperature is achieved and then switching to a low speed until the target temperature is achieved facilitates reducing compressor stop cycles which may occur due to small fluctuations in the sensed temperature which may be caused by such conditions as briefly opening the refrigerator or freezer door. As described herein, increasing temperatures will increase the speed of compressor 219 immediately through a sequential series of temperature ranges, but decreasing speeds are delayed until the entire temperature range of the next lower speed is traversed.

In another exemplary method, the speed of compressor 219 is decreased until the target temperature is achieved. In use, the highest compressor speed achieved during the temperature increase period will be maintained until the temperature reduces to the set-point range, i.e. between approximately −1° F. and approximately +1° F. from the set-point. When the temperature is in the set-point range the speed of compressor 219 will decrease by at least one speed until the lower limit of the set-point range, i.e. −1° F. relative to the set-point, is achieved and the compressor is de-energized. In one embodiment, the setting of the next lower speed can be determined by additional parameters, such as, but not limited to, a time required to get from the measured temperature to the target temperature, and a plurality of ambient temperature measurements.

These methods of targeting an operating speed to be set based on ranges of temperature offset from the target temperature can be used with more or less than 3 speeds and 3 ranges, based on FF, FZ, or FF and FZ temperature targets, and for one or more evaporator designs. The same logic can be applied to similar refrigerant systems (A/C, heat pump, dehumidifier, etc.)

It should be apparent from FIGS. 5 and 6 that the refrigeration system is configured to run substantially full time so long as compartment temperatures exceed minimum threshold values, and subject to defrosting operations wherein the sealed system is shut down. Because the system runs nearly all the time, the system more capably responds to cooling needs due to changing operating conditions and environments, such as door open events, food loading and ambient temperature fluctuation. Consequently, less temperature variation over time in the refrigeration compartments is incurred. In addition, as the system runs at low speed when refrigeration compartment temperatures are at or near user set-points, noise is reduced in normal operation of the refrigerator and energy efficiency is maintained.

Method 300 fundamentally requires data input, such as set-point temperatures and departing ranges, to operate in an appropriate manner. In one embodiment, the data input can be from permanent memory, such as Read-Only Memory (ROM) or Programmable Read-Only Memory (PROM). The data values are determined before the manufacture of the control system. In an alternative embodiment, the data is stored in non-volatile reprogrammable memory, such as Electrically Erasable Programmable Read-Only Memory (EEPROM) 236 (shown in FIG. 3A) car battery backed up Random Access Memory (RAM) so that data values may be determined late in the manufacturing process, and so that data values may be updated in the field.

In one embodiment, access to the data is via Dual In-Line Package (DIP) switches. At manufacture time or service time, the installer sets the DIP switches to match the type of refrigerator in which the control is installed. Alternatively, wires in a refrigerator wiring harness are used to select the board's "personality". The appropriate algorithm and data are automatically selected by the control based on the personality of the refrigerator in which it was installed.

While the invention has been described in terms of various specific embodiments, those skilled in the art will recognize that the invention can be practiced with modification within the spirit and scope of the claims.

What is claimed is:

1. A method for controlling a sealed system including a variable speed compressor coupled to a controller, said method comprising:

defining a first set of temperature ranges for operating the compressor during a temperature increase period; defining a second set of temperature ranges for operating the compressor during a temperature decrease period, the second set of ranges different than the first set of ranges; and operating the compressor using the defined first set and the defined second set, wherein said defining a first set of temperature ranges for operating the compressor during a temperature increase period comprises defining a low temperature range for operating the compressor in a low speed, defining a medium temperature range for operating the compressor in a medium speed, and defining a high temperature range for operating the compressor in a high speed, and wherein the low temperature range is between approximately 1° Fahrenheit (F) and approximately 3° F., the medium temperature range is between approximately 3° F. and approximately 8° F., and the high temperature range is between approximately 8° F. and approximately 2° F.

2. A method for controlling a sealed system including a variable speed compressor coupled to a controller, said method comprising:

defining a first set of temperature ranges for operating the compressor during a temperature increase period; defining a second set of temperature ranges for operating the compressor during a temperature decrease period, the second set of ranges different than the first set of ranges; and operating the compressor using the defined first set and the defined second set, wherein said defining a second set of temperature ranges for operating the compressor during a temperature decrease period comprises defining a low temperature range for operating the compressor in a low speed, defining a medium temperature range for operating the compressor in a medium speed, and defining a high temperature range for operating the compressor in a high speed, and wherein the low temperature range is between approximately −1° Fahrenheit (F) and approximately 1° F., the medium temperature range is between approximately 1° F. and approximately 3° F., and the high temperature range is between approximately 3° F. and approximately 25° F.

3. A method for controlling a sealed system including a viable speed compressor coupled to a controller, said method comprising:

defining a first set of temperature ranges for operating the compressor during a temperature increase period; defining a second set of temperature ranges for operating the compressor during a temperature decrease period, the second set of ranges different than the first set of ranges; and operating the compressor using the defined first set and the defined second set, wherein said operating the compressor using the defined first set and the defined second set further comprises:
  operating the compressor in a high speed until a low temperature range set-point is reached;
  operating the compressor in a medium speed until a set-point upper hysteresis is reached; and
  operating the compressor in a low speed until a set-point lower hysteresis is reached, wherein a target temperature offset set-point is between approximately −1° F. and approximately 1° F.

4. A refrigeration device comprising:
  a compressor operable in a multiplicity of speeds;
  a condenser fan operable in a multiplicity of speeds;
  an evaporator fan operable in a multiplicity of speeds;
  a controller operatively coupled to at least one of said compressor, said condenser fan, and said evaporator fan, said controller comprising a first set of temperature ranges for operating at least one of said compressor, said condenser fan, and said evaporator fan during a temperature increase period and a second set of temperature ranges for operating at least one of said compressor, said condenser fan, and said evaporator fan during a temperature decrease period, said second set of ranges different than said first set of ranges; and
  a thermistor coupled to said controller, said controller configured to operate at least one of said compressor, said condenser fan, and said evaporator fan using said first set of ranges and said second set of ranges, wherein said first set of ranges comprises a low temperature range between approximately 1° Fahrenheit (F) and approximately 3° F., a medium temperature range between approximately 3° F. and approximately 8° F., a high temperature range between approximately 8° F. and approximately 25° F., and a super high temperature range greater than approximately 25° F.

5. A refrigeration device comprising:
  a compressor operable in a multiplicity of speeds;
  a condenser fan operable in a multiplicity of speeds;
  an evaporator fan operable in a multiplicity of speeds;
  a controller operatively coupled to at least one of said compressor, said condenser fan, and said evaporator fan, said controller comprising a first set of temperature ranges for operating at least one of said compressor, said condenser fan, and said evaporator fan during a temperature increase period and a second set of temperature ranges for operating at least one of said compressor, said condenser fan, and said evaporator fan during a temperature decrease period, said second set of ranges different than said first set of ranges; and
  a thermistor coupled to said controller, said controller configured to operate at least one of said compressor, said condenser fan, and said evaporator fan using said first set of ranges and said second set of ranges, wherein said second set of ranges comprises a low temperature range between approximately −1° Fahrenheit (F) and approximately 1° F., a medium temperature range between approximately 1° F. and approximately 3° F., a high temperature range between approximately 3° F. and approximately 25° F., and a super high temperature range greater than approximately 25° F.

6. A refrigeration device comprising:
  a compressor operable in a multiplicity of speeds;
  a condenser fan operable in a multiplicity of speeds;
  an evaporator fan operable in a multiplicity of speeds;
  a controller operatively coupled to at least one of said compressor, said condenser fan, and said evaporator fan, said controller comprising a first set of temperature ranges for operating at least one of said compressor, said condenser fan, and said evaporator fan during a temperature increase period and a second set of temperature ranges for operating at least one of said compressor, said condenser fan, and said evaporator fan during a temperature decrease period, said second set of ranges different than said first set of ranges; and
  a thermistor coupled to said controller, said controller configured to operate at least one of said compressor, said condenser fan, and said evaporator fan using said first set of ranges and said second set of ranges, wherein to operate said compressor using said first set of ranges and said second set of ranges, said controller further configured to:
    operate said compressor in a high speed until a low temperature threshold is reached;
    operate said compressor in a medium speed until a set-point upper hysteresis is reached; and
    operate said compressor in a low speed until a set-point lower hysteresis is reached, wherein a target temperature offset set-point is between approximately −1° F. and approximately 1° F.

7. A control system for a refrigeration system, the refrigeration system including a fresh food compartment and a freezer compartment with a damper establishing flow communication therebetween, a sealed system for forcing cold air through the refrigerator compartments, the sealed system including a compressor, a condenser, an evaporator fan and a fresh food compartment fan, said control system comprising:
  a controller operatively coupled to the damper, the compressor the condenser fan, the evaporator fan and the fresh food fan, said controller comprising a first set of temperature ranges for operating said compressor during a temperature increase period and a second set of temperature ranges for operating said compressor during a temperature decrease period, said second set of ranges different than said first set of ranges; and
  a thermistor coupled to said controller, said controller configured to operate said compressor using said first set of ranges and said second set of ranges, wherein said first set of ranges comprises a low temperature range between approximately 1° Fahrenheit (F) and approximately 3° F., a medium temperature range between approximately 3° F. and approximately 3° F., a high temperature range between approximately 8° F. and approximately 25° F., and a super high temperature range greater than approximately 25° F.

8. A control system for a refrigeration system, the refrigeration system including a fresh food compartment and a freezer compartment with a damper establishing flow communication therebetween, a sealed system for forcing cold air through the refrigerator compartments, the sealed system including a compressor, a condenser, an evaporator fan and a fresh food compartment fan, said control system comprising:
  a controller operatively coupled to the damper, the compressor, the condenser fan, the evaporator fan and the fresh food fan, said controller comprising a first set of temperature ranges for operating said compressor during a temperature increase period and a second set of temperature ranges for operating said compressor during a temperature decrease period, said second set of ages different than said first set of ranges; and a thermistor coupled to said controller, said controller configured to operate said compressor using said first set of ranges and said second set of ranges, wherein said second set of ranges comprises a low temperature range between approximately −1° Fahrenheit (F) and approximately 1° F., a medium temperature range between approximately 1° F and approximately 3° F., a high temperature range between approximately 3° F. and approximately 25° F., and a super high temperature range greater than approximately 25° F.

9. A control system for a refrigeration system, the refrigeration system including a fresh food compartment and a freezer compartment with a damper establishing flow communication therebetween, a sealed system for forcing cold air through the refrigerator compartments, the sealed system including a compressor, a condenser, an evaporator fan and a fresh food compartment fan, said control system comprising:

a controller operatively coupled to the damper, the compressor, the condenser fan, the, evaporator fan and the fresh food fan, said controller comprising a first set of temperature ranges for operating said compressor during a temperature increase period and a second set of temperature ranges for operating said compressor during a temperature decrease period, said second set of ranges different than said first set of ranges; and a thermistor coupled to said controller, said controller configured to operate said compressor using said first set of ranges and said second set of ranges, wherein to operate said compressor using said first set of ranges and said second set of ranges, said control system further configured to:

operate said compressor in a high speed until a low temperature threshold is reached;

operate said compressor in a medium speed until a set-point upper hysteresis threshold is reached; and operate said compressor in a low speed until a set-point lower hysteresis threshold is reached, wherein a target temperature offset set-point is between approximately −1° F. and approximately 1° F.

* * * * *

UNITED STATES PATENT AND TRADEMARK OFFICE
CERTIFICATE OF CORRECTION

PATENT NO. : 6,691,524 B2
DATED : February 17, 2004
INVENTOR(S) : Richard Dana Brooke It is certified that error appears in the above-identified patent and that said Letters Patent is hereby corrected as shown below:

Column 10,
Line 34, delete "approximately 2°" and insert therefor -- approximately 25° --.
Line 60, delete "viable" and insert -- variable --.

Column 12,
Line 50, delete "approximately 3°" and insert therefor -- approximately 8° --.

Signed and Sealed this

Thirteenth Day of September, 2005

JON W. DUDAS
*Director of the United States Patent and Trademark Office*